United States Patent
Teranishi et al.

(10) Patent No.: US 6,502,830 B2
(45) Date of Patent: Jan. 7, 2003

(54) METALLIC GASKET

(75) Inventors: Minoru Teranishi, Osaka (JP); Kiyoshi Sugimoto, Osaka (JP); Kazuya Yoshijima, Aichi-ken (JP)

(73) Assignee: Nippon Gasket Co., Ltd., Osaka (JP)

( * ) Notice: Subject to any disclaimer, the term of this patent is extended or adjusted under 35 U.S.C. 154(b) by 0 days.

(21) Appl. No.: 09/799,517

(22) Filed: Mar. 7, 2001

(65) Prior Publication Data

US 2001/0024018 A1 Sep. 27, 2001

(30) Foreign Application Priority Data

Mar. 24, 2000  (JP) ........................................ 2000-083442

(51) Int. Cl.⁷ ............................................... F02F 11/00
(52) U.S. Cl. ........................ 277/594; 277/591; 277/596
(58) Field of Search ................................. 277/591, 594, 277/596, 600, 601

(56) References Cited

U.S. PATENT DOCUMENTS

| | | | |
|---|---|---|---|
| 4,312,512 A | * 1/1982 | Conte et al. | 277/593 |
| 4,830,698 A | * 5/1989 | DeCore et al. | 156/219 |
| 5,951,021 A | * 9/1999 | Ueta | 277/593 |
| 6,318,733 B1 | * 11/2001 | Udagawa | 277/593 |

FOREIGN PATENT DOCUMENTS

| | | |
|---|---|---|
| JP | 32746/1982 | 7/1982 |
| JP | 52267/1993 | 3/1993 |
| JP | 52268/1993 | 3/1993 |

* cited by examiner

*Primary Examiner*—Anthony Knight
*Assistant Examiner*—Enoch Peavey
(74) *Attorney, Agent, or Firm*—Browdy and Neimark, PLLC

(57) ABSTRACT

A metallic gasket installed between confronting surfaces of engine components is improved in heat conduction between the components so as to reduce the adverse thermal influence to the engine. The metallic gasket used between the confronting surfaces of, for example a cylinder head and a cylinder block is composed of an annular raised portion defining inside a gas hole in alignment with an associated cylinder bore, and a surrounding metallic sheet connected to the annular raised portion. Both the annular raised portion and the surrounding metallic sheet are made of aluminum material to render the heat conduction between the components efficient. Thus the improved gasket can reduce the adverse thermal influence such as thermal deformation, thermal stress, and so on, whether the components are made of different materials or same materials.

16 Claims, 4 Drawing Sheets

METALLIC GASKET

BACKGROUND OF THE INVENTION

1. Field of the Invention

The present invention relates to a metallic gasket of aluminum materials, which is used disposed between confronting surfaces of engine components, for example cylinder heads, cylinder blocks and others.

2. Description of the Prior Art

Conventionally, a head gasket installed between a cylinder head and a cylinder block is chiefly a metallic gasket composed of thin stainless steel sheets overlaid one on the other. Of various metals, stainless steel is considerably low in heat conductivity. In addition, the metallic gaskets are usually applied with a coating of non-metallic substances, which may result in insufficient heat conduction between the cylinder head and the cylinder block.

The aluminum gasket superior in heat conduction is also well known other than the metallic gaskets of layered stainless steel sheets, refer to Japanese Patent Publication No. 32746/1982. Moreover, titanium alloy gaskets or titanium-aluminum alloy gaskets of 6Al—2Sn—4Zn—6Mo alloy, and so on are disclosed in, for example, Japanese Patent Laid-Open Nos. 52267/1993 and 52268/1993.

In an engine composed of an aluminum alloy cylinder head and a cast-iron cylinder block, as the aluminum alloy and cast iron are different from each other in heat conduction and thermal expansion, the metallic gasket is subject to a thermal stress and a thermal distortion, which become unbalance between on one side facing the cylinder head and on the other side facing the cylinder block. With an engine both cylinder head and block are equally made of aluminum alloy, the transfer of hear by conduction is high in the cylinder block so that large difference in temperature is caused between the cylinder head still high in temperature and the cylinder block cooling down rapidly. Nevertheless, the metallic gasket low in heat conductivity has a tendency of offering great resistance or obstruction to the transfer of heat by conduction between the cylinder head and the cylinder block. This creates a major problem in which the internal stress in the cylinder head and the cylinder block is rendered much greater due to beads formed on the stainless steel-made gasket, which is thus much subject to thermal stress and thermal distortion, yielding the inferiority in sealing performance. In addition, the heat radiation from the upper portion of the combustion chamber becomes worse, so that the efficiency of combustion is reduced and consequently the engine will fail to realize the desired performance.

To cope with this, it is desired a head gasket installed between the confronting surfaces of the cylinder head and the cylinder block, which is improved in heat conduction, reduced in a vicious circle of thermal stress and thermal distortion, made simple in construction and further reduced in weight and production cost. In addition, a metallic gasket is needed in which heat is transmitted well from one of the cylinder head and block to another through the gasket, whereby the gasket is improved in durability and reliability.

SUMMARY OF THE INVENTION

A primary object of the present invention is to overcome the major problem stated earlier and in particular provide a metallic gasket adapted to be placed between the confronting surfaces of a cylinder head and a cylinder block, which is improved in the transfer of heat by conduction through the gasket to reduce a vicious circle of thermal stress and thermal distortion, made light in weight and inexpensive in production cost. In addition, the head-gasket installation of the present invention helps ensure a good heat transmission between the cylinder head and the cylinder block, improving durability and reliability on sealing effect at the joint between the confronting surfaces, thereby raising the combustion efficiency of the engine.

The present invention is concerned with a metallic gasket adapted disposed between confronting surfaces of engine components with combustion bores to seal a joint between the confronting surfaces when clamping together the engine components opposed to each other, the improvement comprised of a annular raised portion defining inside a gas hole in alignment with any combustion hole in the engine components, a surrounding metallic sheet arranged about the annular raised portion and connected to the annular raised portion, both the annular raised portion and the surrounding metallic sheet being made of aluminum material, and a soft sealing member deposited on the surrounding metallic sheet around the annular raised portion, wherein the annular raised portion and the soft sealing member come in abutment with any mating surface of the confronting surfaces when the gasket is squeezed in place between the confronting surfaces of the components, thereby sealing together the confronting surfaces.

In accordance with one aspect of the present invention, there is provided a metallic gasket wherein the annular raised portion is a single ridge extended around the gas hole and raised thickness-wise of the gasket above a plane of at least any one surface of the surrounding metallic sheet when viewed in an axial section of the gas hole. Alternatively, the annular raised portion includes a radially inside ridge and a radially outside ridge around the gas hole, and both the inside and outside ridges are raised thickness-wise of the gasket above a plane of at least any one surface of the surrounding metallic sheet when viewed in an axial section of the gas hole. As the annular raised portion, whether a single ridge or the combined radially inside and outside ridges, are raised above a plane of at least any one surface of the surrounding metallic sheet, the annular raised portion is compressed between the confronting surfaces when the gasket is squeezed in place between the confronting components, thereby ensuring a row or two rows of high sealing stress.

In accordance with another aspect of the present invention, there is provided a metallic gasket wherein the components are a cylinder block and a cylinder head to be fastened to the cylinder block, the gas hole encircled with the annular raised portion is communicated with associated cylinder bores in the components, and the radially outside ridge of the annular raised portion formed around any one of the adjacent gas holes comes in partially merging with the radially outside ridge of the annular raised portion formed around another of the adjacent gas holes at an area between the adjacent gas holes.

In accordance with another aspect of the present invention, there is provided a metallic gasket wherein the annular raised portion is formed in cross section in any one of circle, ellipse and oval in which a radial inside is made larger thickness-wise of the gasket than a radial outside. Moreover, the annular raised portion is made in any one of solid and hollow constructions. The annular raised portion may be fabricated by any metalworking of forging and pressing processes.

In accordance with a further another aspect of the present invention, there is provided a metallic gasket wherein the annular raised portion is applied with a thermal sprayed coating of aluminum alloy superior in heat resistance and corrosion resistance to improve the gasket in heat resistance, corrosion resistance and strength.

In accordance with another aspect of the present invention, there is provided a metallic gasket wherein the surrounding metallic sheet is of at least an aluminum sheet.

In accordance with another aspect of the present invention, there is provided a metallic gasket wherein the surrounding metallic sheet is of two aluminum sheets while the annular raised portion is composed of a ring body and a lug extending around the ring body, the lug being disposed between the two aluminum sheets.

In a further another aspect of the present invention, there is provided a metallic gasket wherein the surrounding metallic sheet is recessed below any one surface thereof, where the soft sealing member is charged. Moreover, the recess formed along the annular raised portion around any one of the adjacent gas holes comes in merging with the recess formed along the annular raised portion around another of the adjacent gas holes at an area between the adjacent gas holes. The soft sealing member, since adhered and charged in the recess formed in the surface of the surrounding metallic sheet, is securely held on the surrounding metallic sheet.

With the metallic gasket constructed as recited earlier, both the annular raised portion and the soft sealing member, when squeezed between the mating surfaces to fasten together the confronting components, come in engagement with the mating surfaces to help ensure the high sealing performance around the associated gas hole.

Since the metallic gasket of the present invention is made of any aluminum material of commercial-purity aluminum or aluminum alloys, the metallic gasket serves well in heat conduction when installed between, for example the cylinder block and the cylinder head, compared with the gasket of stainless steel sheet, so that there is no obstruction to the transfer of heat by conduction arising the temperature difference between the cylinder block and the cylinder head, and thus the gasket is less subject to thermal deformation and thermal stress, which might otherwise occur in the gasket in itself. This contributes to improvement in strength, heat resistance, durability and reliability of the gasket. Further, the metallic gasket of the present invention does not spoil the heat conduction between the components even if the engine components are made of the substantially same aluminum material as the metallic gasket, and the components are also different in cooling ability.

In the metallic gasket of the present invention, the annular raised portion or ring body around the gas hole is made of aluminum material, and for the sake of which the annular raised portion or ring body, when squeezed, can follow well the deformation in the cylinder block and the cylinder head to be deformed easily depending on the design conditions. This would make realization of uniform sealing stress around the gas hole much easier, with no need of previously varying the thickness or height of the annular raised portion or the ring body circumferentially of the gas hole to ensure the sealing stress uniform around the gas hole. Moreover, the metallic gasket of the present invention is provided with an elastic sealing member extending around the gas hole to help ensure the overall good sealing efficiency. Besides, it will be understood that even when the metallic gasket of the present invention is adopted for the gasket in which the bead is varied previously in height circumferentially of the gas hole to realize the even sealing stress around the gas hole, the sealing stress would be adjusted much more evenly around the gas hole with high accuracy.

The metallic gasket of the present invention is simple in construction, light in weight and also reduced in production cost. Because the aluminum material is low in specific gravity compared with the stainless steel material, it will be sure that the aluminum gasket is made reduced in weight and further the aluminum gasket won't rise in production cost above the layered construction of stainless steel sheets.

The metallic gasket of the present invention, as comparable in thermal deformation and thermal stress with both the cylinder block and the cylinder head, is less subject to the difference in thermal influence, thereby made uniformed in thermal influence that might otherwise affect the metallic gasket. Further, the metallic gasket of the present invention may serve well keeping the transfer of heat by conduction through the gasket between the cylinder block and the cylinder head, whether the cylinder block and the cylinder head are made of different materials or they are of the same material and also different in cooling ability. Thus, the metallic gasket of the present invention ensures good sealing performance and improvement in durability and reliability.

In addition, the metallic gasket of the present invention helps ensure an even heat distribution in the overall engine, reducing the thermal affection of thermal deformation, thermal stress, and so on, thereby raising the combustion efficiency of the engine.

Other aspects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

A metallic gasket according to the present invention will be in detail explained below with reference to the accompanying drawings showing preferred embodiments of the present invention.

Figure 1:
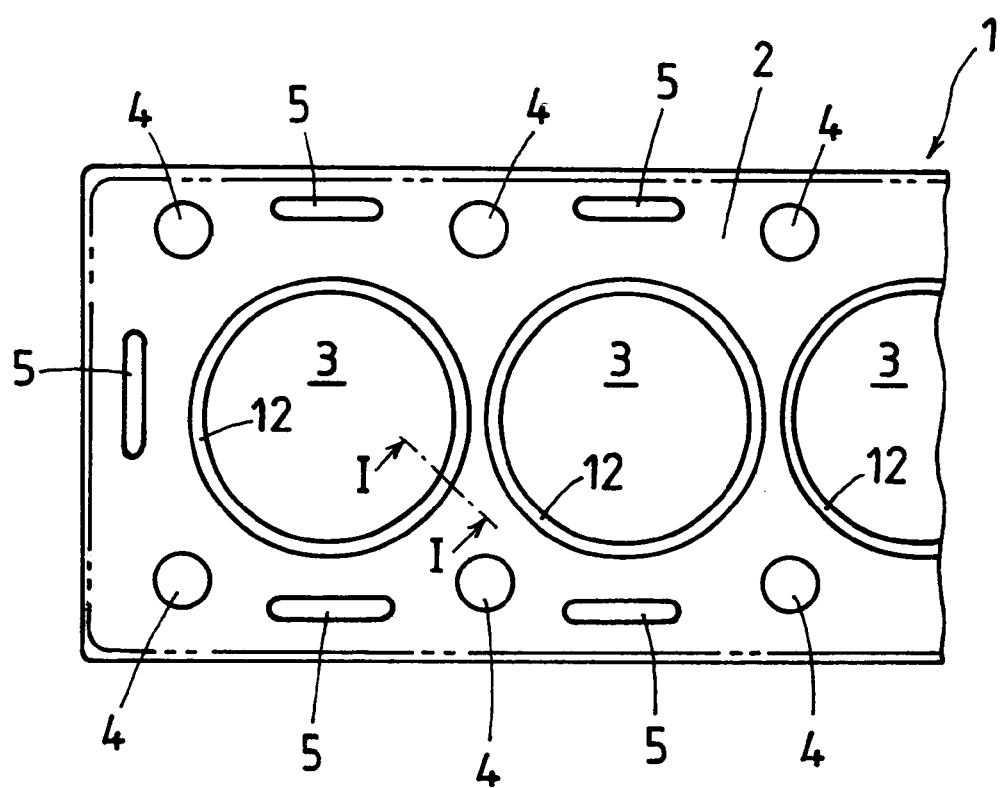
FIG. 1 is a fragmentary plan view showing a preferred embodiment of a metallic gasket according to the present invention.

A metallic gasket 1 in the first embodiment of the present invention is adapted for a multi-cylinder engine such as a four-cylinder or six-cylinder engine. The metallic gasket 1, as shown in FIG. 1, is made of an aluminum sheet including annular raised portions 12 and a surrounding metallic sheet 2 extending around the annular raised portions 12. The annular raised portions 12 define combustion gas holes 3, one to each hole, which are arranged in juxtaposition in alignment with cylinder bores formed in a cylinder block, one to each cylinder bore. The surrounding metallic sheet 2 is made with coolant holes 5 for allowing cooling water flow through there, and bolt holes 4 in which fastening bolts, not shown, fit to squeeze the metallic gasket 1 between the confronting cylinder head and cylinder block. The surrounding metallic sheet 2 has other diverse holes such as oil holes, knock holes, and so on.

All the surrounding metallic sheet 2 and the annular raised portions 12 are fabricated from any aluminum product selected from commercial-purity aluminum and aluminum alloys containing elements such as magnesium (Mg), chromium (Cr), silicon (Si), copper (Cu), and so on. Instead of the aluminum sheet recited just above, an aluminum-cladding plate may be adopted to ensure the resistance to electrolytic corrosion, and so on. With the cylinder head and the cylinder block made of aluminum alloys, the gasket is also preferably made of alloys, for example Al—Cu—Ni—Mg alloy. The aluminum alloys are superior in corrosion resistance, metalworking ability and fatigue resistance, and commercially available for vessels, LNG holders, and so on. Although aluminum alloy sheets are suitable for the gasket material, but any other material much high in strength may be just as well used for the gasket material. The aluminum material may be fabricated in gaskets by metalworking technique such as aluminum forging, aluminum casting, press-forming, and so on.

Figure 2:
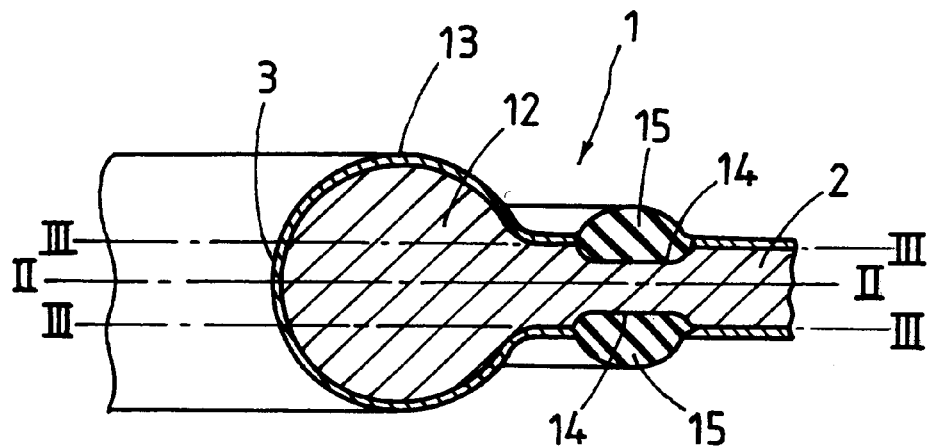
FIG. 2 is a fragmentary sectional view of the metallic gasket taken along the line I—I of FIG. 1.

Referring to FIG. 2 showing a section of the metallic gasket 1 taken along the line I—I of FIG. 1, the metallic gasket 1 is composed of the surrounding metallic sheet 2 and the annular raised portion 12 integral with the surrounding metallic sheet 2. A gas hole 3 is encircled with the annular raised portion 12. The annular raised portion 12, viewed in cross section thereof, is formed in a substantially circular shape in cross section when no clamping force is applied, aside from an area merging in the surrounding metallic sheet 2. The annular raised portion 12 bulges in opposition to one another above planes III—III of opposite surfaces of the surrounding metallic sheet 2 in symmetry with respect to a thickness-wise center plane II—II of the surrounding metallic sheet 2. Moreover, the annular raised portion 12 is made solid with aluminum substance. When the clamping force that results from the tightening of the fastening bolt is applied to the metallic gasket 1 placed between the cylinder head and the cylinder block, the annular raised portion 12 experiences a highly compressive sealing stress, thereby coming into high sealing contact with the mating around the associated hole 3 to realize the high sealing effect that prevents leakage of high-temperature, high-pressure combustion gases from the joint between the mating surfaces around the holes 3, as with other metallic gaskets with beads around the holes 3.

All the annular raised portions 12 and the surrounding metallic sheet 2 may be applied with a thermal sprayed coating 13 of metals such as aluminum, which exhibit heat resistance or corrosion resistance. The thermal sprayed coating 13 needs not be uniformly applied the overall surface of all the annular raised portions 12 and the surrounding metallic sheet 2; the coating 13 can be applied selectively on only areas around the holes 3, where the high sealing effect is required invariably. The thermal sprayed coating 13 contributes to still more improvement in heat resistance, corrosion resistance or strength of the metallic gasket 1.

The surrounding metallic sheet 2 is made reduced in thickness at an area neighboring the associated gas hole 3, where the surrounding metallic sheet 2 is concaved in opposition to each other below the opposite surfaces thereof to form recesses 14 on the opposite surfaces, one to each surface, extending along the associated annular raised portion 12 at an annular zone radially outwardly of the annular raised portion 12. Soft sealing members 15 are charged and adhered to the recesses 14, one to each recess. Although but the soft sealing members 15 are shown made lower in height than the annular raised portions 12 in the illustrative embodiments of FIGS. 2 and 3, it will be appreciated that the soft sealing member may be made equal in height with the annular raised portion. The soft sealing member 15 can be made of any one of rubbers, resins and graphite such as expanded graphite. Because not only has the expanded graphite various properties needed for sealing member, the graphite is also approximately equivalent in heat conductivity with aluminum and further light in weight, the expanded graphite is preferable in combination with the aluminum member to provide a bead to seal the gas hole on itself, or an auxiliary bead to seal the gas hole in favor of the sealing effect of the annular raised portion 12. Alternatively, the soft sealing member may be made of heat-resisting rubber such as silicone rubber, fluoro rubber, and so on, or urethane polymer material. Although the soft sealing material is adopted for local sealing member in the illustrative embodiments, it will be appreciated that the material may be applied to a skin for surface treatment of the aluminum material. Moreover, the thermal sprayed coating 13 is unnecessary at the recesses 14.

Figure 3:
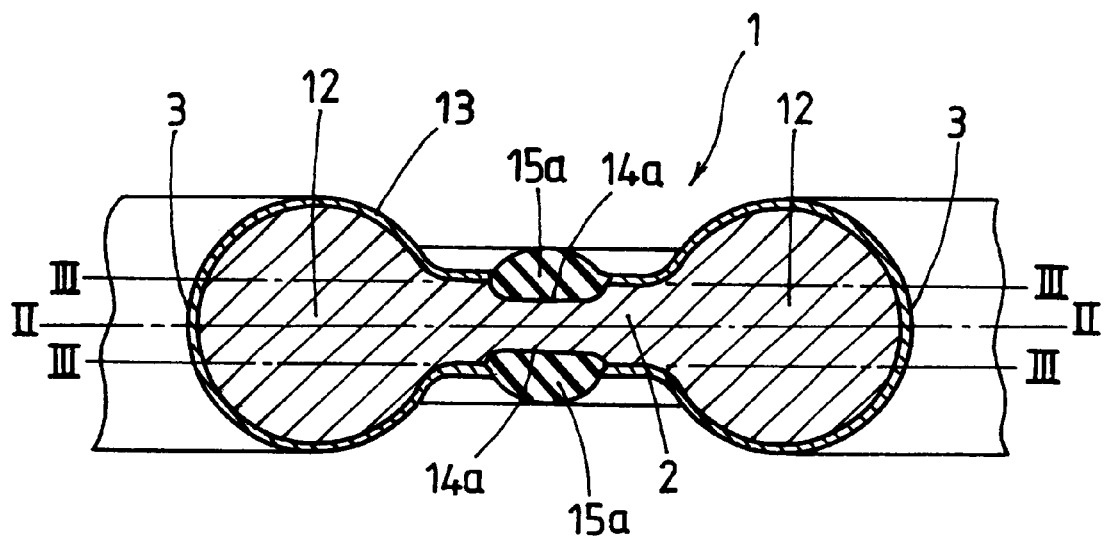
FIG. 3 is a fragmentary sectional view of the metallic gasket of FIG. 1 to illustrate in detail an area between any two juxtaposed holes.

With the metallic gasket 1 stated earlier, the thickness-wise opposing recesses 14 around any one of the annular raised portion 12 comes in merging with another recesses 14 around another annular raised portion 12 into common recesses 14a, one to each surface of the gasket 1, at the area between the adjoining holes 3 as shown in FIG. 3. The soft sealing members 15 arranged in the recesses 14 around the associated annular raised portions 12 also merge in common soft sealing members 15, one to each gasket surface.

Figure 4:
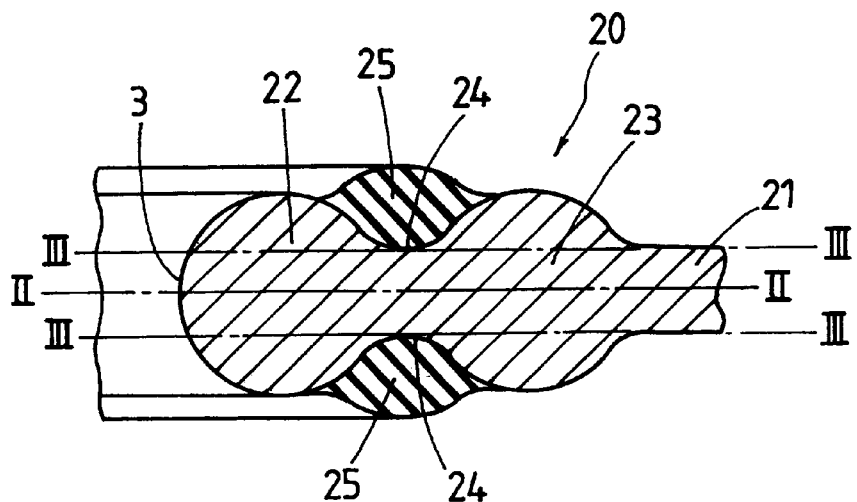
FIG. 4 is a fragmentary sectional view of a second embodiment of the metallic gasket according to the present invention.

Next referring to FIG. 4 showing in cross section a second embodiment of the metallic gasket according to the present invention, a metallic gasket 20 is substantially identical in application to the engine and in aluminum material with the first embodiment stated earlier. With the metallic gasket 20, a metallic sheet 21 surrounding the combustion gas holes 3 includes therein a radially inside raised portion 22 extending around the associated hole 3, and a radially outside raised portion 23 encircling around the inside raised portion 22. The inside raised portion 22 is substantially similar in shape with the annular raised portion 12 in the first embodiment. Both the inside and outside raised portions 22, 23 are solid and made bulged in cross section equally above planes III—III of opposite surfaces of the surrounding metallic sheet 21. Formed between the inside and outside raised portions 22, 23 is annular depressions 24 on the opposite sides of the gasket 20, one to each side, which are each filled with a soft sealing member 25 heaping up to a height above both the inside and outside raised portions 22, 23. The metallic gasket 20, as with the metallic gasket 1 of the first embodiment, is in symmetry with respect to the thickness-wise center plane II—II of the gasket, while the soft sealing member 25 is made of the same substance recited earlier in the first embodiment.

Figure 5:
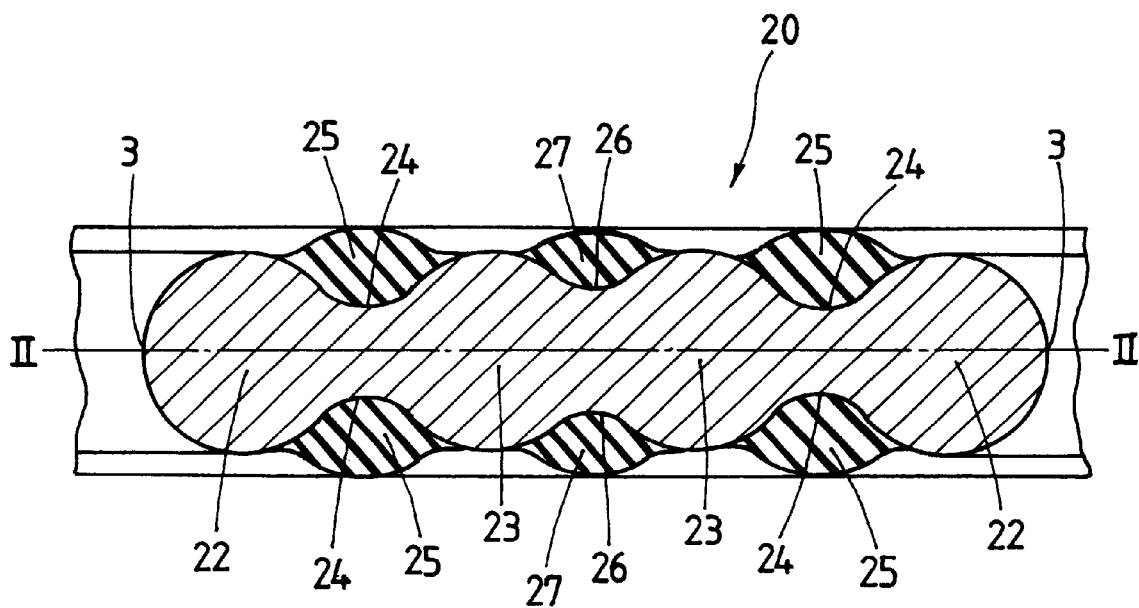
FIG. 5 is a fragmentary sectional view of the metallic gasket of FIG. 4 to illustrate in detail an area between any two juxtaposed holes.

Further referring to FIG. 5 in which the metallic gasket 20 according to the second embodiment of FIG. 4 is shown in cross section at an area between the adjoining holes 3, the outside raised portion 23 around any one of the adjoining holes 3 comes in partially merging with another outside raised portion 23 around another hole 3 to form third shallow depressions 26 between them, one to each surface of the gasket 20, at the area between the adjoining holes 3 as shown in FIG. 5. The soft sealing members 27 are also arranged in the depressions 26, with heaping up likewise with the soft sealing members 25.

Figure 6:
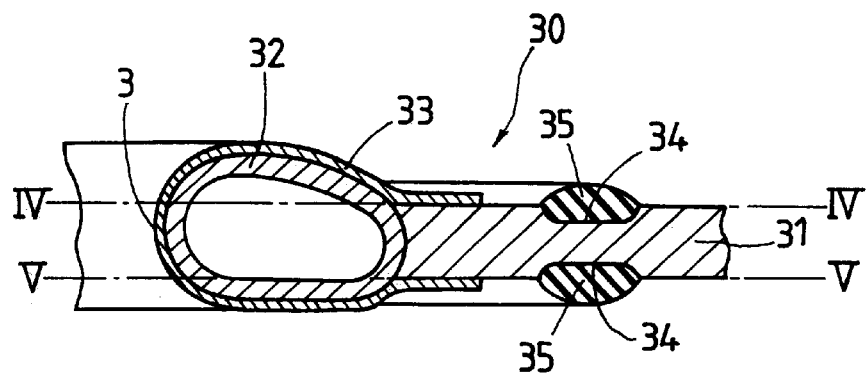
FIG. 6 is a fragmentary sectional view of a third embodiment of the metallic gasket according to the present invention.

FIG. 6 shows in cross section a third embodiment of the metallic gasket according to the present invention. In a metallic gasket 30 of FIG. 6, an annular hollow bulge 32 is attached by welding or the like to a surrounding metallic sheet 31. The hollow bulge 32 is formed in an oval in cross section, in which the radial inside is made somewhat larger thickness-wise of the gasket than the radial outside. Moreover, the hollow bulge 32 without squeezed between the mating surfaces is raised in opposition thickness-wise of the gasket above planes IV—IV, V—V on opposite surfaces of the surrounding metallic sheet 31 in such asymmetry that a rise above any one plane on one surface of the surrounding metallic sheet 31, or upper plane IV—IV in FIG. 6, is greater in height than another rise above the reverse plane, or lower plane V—V In order to improve the heat resistance, corrosion resistance and strength at the specific areas neighboring the holes 3, which might be exposed to high-pressure high-temperature combustion gases, a thermal sprayed coating 33 of heat-resisting or corrosion-resisting aluminum, similar with the thermal sprayed coating 13 in the first embodiment, is applied over the hollow bulge 32 and the neighborhood area in the surrounding metallic sheet 31. The surrounding metallic sheet 31 is also made reduced in thickness at a radially outside area around the annular hollow bulge 32, where the surrounding metallic sheet 32 is concaved in opposition to each other below the opposite surfaces thereof to form recesses 34 on the opposite surfaces, one to each surface, extending along the associated annular hollow bulge 32 at an annular zone radially outwardly of the annular hollow bulge 32. Soft sealing members 35 are charged and adhered to the recesses 34, one to each recess. The soft sealing members 35, although but shown made lower in height than the annular hollow bulges 32 in the embodiment of FIG. 6, may be made substantially equal in height with the annular hollow bulges 32. The metallic gasket 30 is principally identical with the first embodiment in joint construction with the engine components, aluminum materials and in substances and functions of the soft sealing member. To that extent, the previous description will be applicable.

As the clamping force squeezes the metallic gasket 30 of the third embodiment installed between the confronting surfaces of the cylinder head and the cylinder block, the hollow bulge 32 is forced to compress between the confronting surfaces, creating a highly compressive sealing stress to realize a high sealing effect, thereby preventing efficiently leakage of high-temperature, high-pressure combustion gases from the joint between the confronting surfaces.

Figure 7:
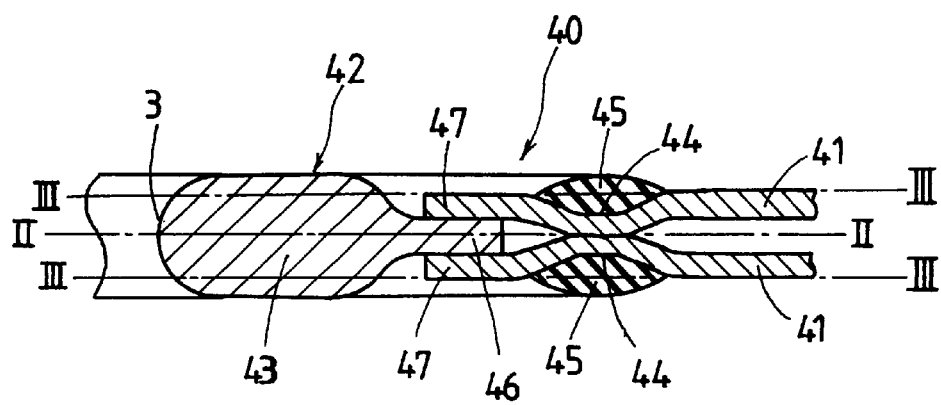
FIG. 7 is a fragmentary sectional view of a fourth embodiment of the metallic gasket according to the present invention.

Next referring to FIG. 7 showing in cross section a fourth embodiment of the metallic gasket according to the present invention, the fourth metallic gasket 40 in FIG. 7 is comprised of two surrounding sheets 41 overlaid one on another, and an annular solid member 42 of aluminum material combined with the surrounding sheets 41 to define inside a combustion hole 3. The annular solid member 42 is made larger in thickness than the surrounding sheets 41. The annular solid member 42 consists of a solid ring 43 of cross section resembling an oval and encircling the hole 3, and a lug 46 thinner considerably than the solid ring 43 and extending radially outwardly of the solid ring 43. The surrounding sheets 41 are raised at a preselected area around the associated hole 3 towards each other above a surface facing the opposite sheet to thereby form annular depressions 44, one to each outside surface of the gasket 40. The annular lug 46 of the annular solid member 42 is disposed or sandwiched between confronting circular edges 47 extending around the associated hole 3. The soft sealing members 45 are each charged in the associated depression 44 and heaped up to the height at most corresponding to the thickness of the annular solid member 42 under no squeezing, although above the associated outside surface of the surrounding metallic sheets 41. The fourth metallic gasket 40 is also in symmetry with respect to the thickness-wise center plane II—II under the condition no clamping force is applied to the gasket 40, and moreover is principally identical with the first embodiment in joint construction with the engine components, aluminum materials and in substances of the soft sealing member 45.

With the fourth metallic gasket 40, the clamping force to squeeze the metallic gasket 40 between the confronting surfaces of the cylinder head and the cylinder block presses down the annular solid member 42 against the mating surfaces to create the highly compressive sealing stress to accomplish a high sealing effect, thereby preventing efficiently leakage of high-temperature, high-pressure combustion gases from the joint between the confronting surfaces.

Figure 8:
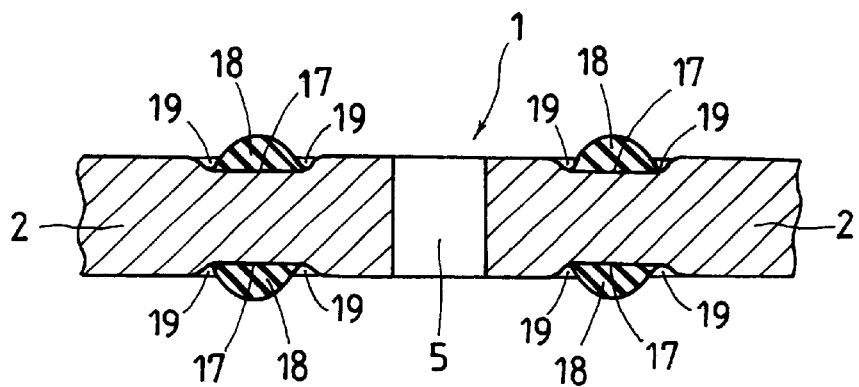
FIG. 8 is a fragmentary sectional view showing a construction around a coolant hole or oil hole in a metallic gasket according to the present invention.

Finally referring to FIG. 8 illustrating in cross section a construction neighboring coolant hole or oil hole 5 in the metallic gasket, for example the first metallic gasket 1 constructed in accordance with the present invention, the surrounding metallic sheet 2 of the metallic gasket in FIG. 8 has a coolant hole 5 around which are formed grooves 17. Although the grooves 17 are applied with soft sealing members 18 of a material that is similar with the soft sealing member 15 stated earlier, the soft sealing member 18 is applied in such a manner to fill in the grooves 17 not completely, but leaving clearances 19 for the sake of which the soft sealing member 18, when having experienced the compressive force, is permitted to undergo deformation radially outwardly and/or inwardly of the associated coolant hole 5. Thus, the soft sealing member 18 may be kept against deterioration in sealing function, which might otherwise result from excessive flattening of the sealing member.

While the metallic gasket of the present invention has been particularly shown and described with reference to what is known as the head gasket used to seal the joint between the confronting surfaces of the cylinder head and the cylinder block, it will be obvious to those skilled in the art that the present invention may be applied with equal utility to any gasket used installed between the cylinder head and the intake and/or exhaust manifolds. Moreover, the surrounding metallic sheets may be made of aluminum-cladding sheet for electolytic corrosion resistance, and so on. The annular raised or bulged portions may be coated with a skin that is previously formed by oxidation treatment or conversion treatment such as chromate, and so on. It will be also appreciated that the annular raised or bulged portions may be applied, whether overall or partially, with sheets of graphite such as expanded graphite superior in heat conductivity in order to improve the aluminum material in corrosion resistance. Besides, the aluminum material for the metallic gasket may be clad or overlaid with a thin sheet or foil of stainless steel, which has a thickness of the extent that should not be allowed to spoil remarkably the heat conductivity, whereby the metallic gasket is improved locally in strength. In addition, the soft sealing member is not limited in height to the illustrative embodiment, but may be changed adequately in height.

What is claimed is:

1. In a metallic gasket adapted to be disposed between confronting surfaces of engine components with combustion bores to seal a joint between the confronting surfaces when clamping together the engine components opposed to each other;

the improvement comprising a annular raised portion defining inside a gas hole in alignment with any combustion hole in the engine components, a surrounding metallic sheet arranged about the annular raised portion and connected to the annular raised portion, both the annular raised portion and the surrounding metallic sheet being made of aluminum material, and a soft sealing member deposited on the surrounding metallic sheet around the annular raised portion, wherein the annular raised portion and the soft sealing member come in abutment with any mating surface of the confronting surfaces when the gasket is squeezed in place between the confronting surfaces of the components, thereby sealing together the confronting surfaces, wherein the surrounding metallic sheet is recessed below any one surface thereof, where the soft sealing member is charged, and wherein the recess formed along the annular raised portion around any one of the adjacent gas holes merges with the recess formed along the annular raised portion around another of the adjacent gas holes at an area between the adjacent gas holes.

2. An improvement as recited in claim 1, wherein the annular raised portion is a single ridge extended around the gas hole and raised thickness-wise of the gasket above a plane of at least any one surface of the surrounding metallic sheet when viewed in an axial section of the gas hole.

3. An improvement as recited in claim 1, wherein the annular raised portion includes a radially inside ridge and a radially outside ridge around the gas hole, and both the inside and outside ridges are raised thickness-wise of the gasket above a plane of at least any one surface of the surrounding metallic sheet when viewed in an axial section of the gas hole.

4. An improvement as recited in claim 1, wherein the annular raised portion is formed in cross section in any one of a circle, ellipse or oval in which a radial inside is made larger thickness-wise of the gasket than a radially outside.

5. An improvement as recited in claim 1, wherein the annular raised portion is made in any one of a solid or hollow construction.

6. An improvement as recited in claim 1, wherein the annular raised portion is fabricated by any metalworking of forging or pressing processes.

7. An improvement as recited in claim 1, wherein the annular raised portion is applied with a thermal sprayed coating of aluminum alloy superior in heat resistance and corrosion resistance to improve the gasket in heat resistance, corrosion resistance and strength.

8. An improvement as recited in claim 1, wherein the surrounding metallic sheet is of at least an aluminum sheet.

9. An improvement as recited in claim 1, wherein the surrounding metallic sheet is of two aluminum sheets while the annular raised portion is composed of a ring body and a lug extending around the ring body, the lug being disposed between the two aluminum sheets.

10. In a metallic gasket adapted to be disposed between confronting surfaces of engine components with combustion bores to seal a joint between the confronting surfaces when clamping together the engine components opposed to each other;

the improvement comprised of an annular raised portion defining inside a gas hole in alignment with any combustion hole in the engine components, a surrounding metallic sheet arranged about the annular raised portion and connected to the annular raised portion, both the annular raised portion and the surrounding metallic sheet being made of aluminum material, and a soft sealing member deposited in the surrounding metallic sheet around the annular raised portion, wherein the annular raised portion and the soft sealing member come in abutment with any mating surface of the confronting surfaces when the gasket is squeezed in place between the confronting surfaces of the components, thereby sealing together the confronting surfaces, wherein the annular raised portion includes a radially inside ridge and a radially outside ridge around the gas hole, and both the inside and outside ridges are raised thickness-wise of the gasket above a plane of at least any one surface of the surrounding metallic sheet when viewed in an axial section of the gas hole, and wherein the components are a cylinder block and a cylinder head to be fastened to the cylinder block, the gas hole encircled with the annular raised portion is communicated with associated cylinder bores in the components, and the radially outside ridge of the annular raised portion formed around any one of the adjacent gas holes partially merges with the radially outside ridge of the annular raised portion formed around another of the adjacent gas holes at an area between the adjacent gas holes, thereby providing a recess that is made less in depth, compared with other recess formed between the radially inside and outside ridges around any of the adjacent gas holes at the area between the adjacent gas holes.

11. An improvement as recited in claim 10, wherein the annular raised portion is formed in cross section in any one of a circle, ellipse or oval in which a radial inside is made larger thickness-wise of the gasket than a radially outside.

12. An improvement as recited in claim 10, wherein the annular raised portion is made in any one of solid or hollow construction.

13. An improvement as recited in claim 10, wherein the annular raised portion is fabricated by any metalworking of forging and pressing processes.

14. An improvement as recited in claim 10, wherein the annular raised portion is applied with a thermal sprayed coating of aluminum alloy superior in heat resistance and corrosion resistance to improve the gasket in heat resistance, corrosion resistance and strength.

15. An improvement as recited in claim 10, wherein the surrounding metallic sheet is of at least an aluminum sheet.

16. An improvement as recited in claim 10, wherein the surrounding metallic sheet is of two aluminum sheets while the annular raised portion is composed of a ring body and a lug extending around the ring body, the lug being disposed between the two aluminum sheets.

* * * * *